UNITED STATES PATENT OFFICE.

CHARLES METTLER, OF BASEL, SWITZERLAND, ASSIGNOR TO J. R. GEIGY S. A., OF BASEL, SWITZERLAND.

MORDANT-DYEING AZO DYE.

1,157,169.

Specification of Letters Patent. Patented Oct. 19, 1915.

No Drawing. Application filed November 3, 1914. Serial No. 870,041.

*To all whom it may concern:*

Be it known that I, CHARLES METTLER, a citizen of the Swiss Republic, and a resident of Basel, in Switzerland, have invented certain new and useful Improvements in Mordant-Dyeing Azo Dyes, of which the following is a specification.

I have discovered that the azo dyestuff manufactured from ortho-chloro-meta-aminobenzoic acid and salicylic acid exchanges in aqueous solution chlorin for hydroxyl under the influence of alkalis at a raised temperature and according to the formula

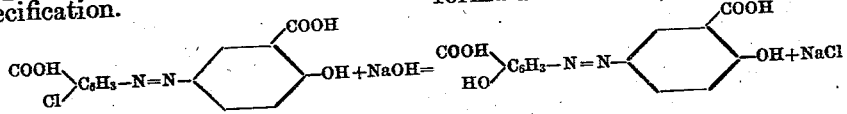

yields the hitherto unknown corresponding azosalicylic acid.

The product, which I thus obtain, dyes wool in acid bath yellow level shades, which by subsequent treatment with chromium salts are converted into a bright greenish yellow distinguished by its fastness to the action of light, potting and milling.

For practically carrying out my invention I may proceed as follows, the parts being by weight: 17.2 parts of ortho-chloro-meta-amino-benzoic-acid are diazotized as usual in an aqueous solution by means of 7 parts of sodium nitrite and 60 parts of hydrochloric acid of 21° Baumé and then slowly stirred into a solution of 14.5 parts of salicylic acid containing an excess of soda. The liquid is allowed to stand for some time, afterward the dyestuff is precipitated with common salt and filtered. The presscakes are mixed with 150 parts of water and 50 parts of caustic soda lye of 40° Baumé with a slight addition of copper powder—which however is not absolutely necessary—and heated for 10 hours at 150° C. in an autoclave. After cooling the solution is neutralized, the coloring matter precipitated with salt, filtered and dried. The dyestuff thus obtained forms when pulverized a yellow powder which dissolves in water to a greenish yellow solution, which on the addition of caustic soda lye turns to orange and which solution on the addition of diluted-hydrochloric acid separates light brown flakes, but not on addition of acetic acid in presence of acetate.

The new coloring matter is slightly soluble in alcohol with yellow coloration and dissolves in concentrated sulfuric acid to a dark orange solution. By reduction with stannous chlorid and hydrochloric acid amino-salicylic acid is obtained.

Having now described my invention and the manner in which it may be carried out, what I claim is:

The herein-described azo dye having most probably the following formula:

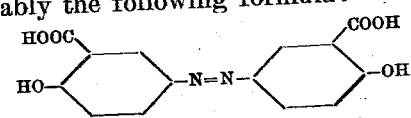

and which can be obtained by heating the azo dyestuff from diazotized ortho-chloro-meta-amino-benzoic acid and salicylic acid with alkalis to a raised temperature, which new dyestuff dyes wool from an acid bath a yellow level shade, which shade on a subsequent treatment with chromium-compounds is converted into a bright green-yellow tint, this tint being distinguished by its great fastness to light, potting and milling, and which coloring matter forms, when pulverized a yellow powder, dissolving in water to a yellow solution, which on the addition of caustic soda lye turns to orange and which solution on the addition of diluted hydrochloric acid separates light brown flakes, but not on addition of acetic acid in presence of acetate and which coloring matter is slightly soluble in alcohol with yellow coloration; dissolving in concentrated sulfuric acid to a dark orange solution and yielding upon reduction amino-salicylic acid.

In testimony whereof I have hereunto set my hand in presence of two subscribing witnesses.

Signed at Basel in Switzerland, this 16th day of July, 1915.

CHARLES METTLER.

Witnesses:
 ARNOLD ZUBER,
 CHARLES BURGET.